United States Patent
Partyka et al.

(10) Patent No.: US 10,024,183 B2
(45) Date of Patent: Jul. 17, 2018

(54) GAS TURBINE ENGINE ROTOR DISK-SEAL ARRANGEMENT

(71) Applicant: United Technologies Corporation, Farmington, CT (US)

(72) Inventors: Julian Partyka, West Springfield, MA (US); Jonathan P. Sandoval, Hebron, CT (US)

(73) Assignee: United Technologies Corporation, Farmington, CT (US)

( * ) Notice: Subject to any disclaimer, the term of this patent is extended or adjusted under 35 U.S.C. 154(b) by 308 days.

(21) Appl. No.: 14/775,388

(22) PCT Filed: Mar. 14, 2014

(86) PCT No.: PCT/US2014/027316
§ 371 (c)(1),
(2) Date: Sep. 11, 2015

(87) PCT Pub. No.: WO2014/152414
PCT Pub. Date: Sep. 25, 2014

(65) Prior Publication Data
US 2016/0017737 A1    Jan. 21, 2016

Related U.S. Application Data

(60) Provisional application No. 61/783,674, filed on Mar. 14, 2013.

(51) Int. Cl.
*F01D 11/00* (2006.01)
*F01D 5/30* (2006.01)
(Continued)

(52) U.S. Cl.
CPC .......... *F01D 11/001* (2013.01); *F01D 5/3007* (2013.01); *F01D 5/3015* (2013.01);
(Continued)

(58) Field of Classification Search
CPC ...... F01D 11/001; F01D 5/027; F01D 5/3015; F05D 2260/15; F16F 15/302; F16F 15/315; F16F 15/3153; F16F 15/322
(Continued)

(56) References Cited

U.S. PATENT DOCUMENTS 5,318,405 A * 6/1994 Meade .................. F01D 5/3015
416/220 R
5,582,077 A * 12/1996 Agram ................... F01D 5/027
403/318

(Continued)

*Primary Examiner* — Ninh H Nguyen
*Assistant Examiner* — Topaz L Elliott
(74) *Attorney, Agent, or Firm* — O'Shea Getz P.C.

(57) ABSTRACT

A disk-seal arrangement for a gas turbine engine rotor includes a blade retention disk having a longitudinally opening slot therein and a seal disk juxtaposed to said blade retention disk and a single anti-rotation tab received within the blade retention disk slot. The seal disk also includes a pair of balance slots disposed immediately adjacent the antirotation tab to offset the weight thereof for preserving rotor balance. A split ring is disposed longitudinally between the blade retention and seal disks for reacting longitudinal loading therebetween. The ends of the split ring seat against side surfaces of the antirotation between the split ring and the blade retention and seal disks.

12 Claims, 3 Drawing Sheets

(51) Int. Cl.
*F02C 7/28* (2006.01)
*F01D 5/02* (2006.01)

(52) U.S. Cl.
CPC ............... *F02C 7/28* (2013.01); *F01D 5/027* (2013.01); *F05D 2220/32* (2013.01); *F05D 2240/12* (2013.01); *F05D 2240/55* (2013.01); *F05D 2250/73* (2013.01); *F05D 2260/15* (2013.01); *Y02T 50/673* (2013.01)

(58) Field of Classification Search
USPC ........................................................ 280/217
See application file for complete search history.

(56) References Cited

U.S. PATENT DOCUMENTS

| | | | |
|---|---|---|---|
| 6,106,234 A | 8/2000 | Gabbitas | |
| 7,290,988 B2* | 11/2007 | Boston | F01D 5/3015 416/220 R |
| 8,313,289 B2* | 11/2012 | Caprario | F01D 5/3015 415/173.7 |
| 9,567,857 B2* | 2/2017 | Snyder | F01D 1/02 |
| 2003/0017050 A1 | 1/2003 | Simeone et al. | |
| 2009/0148295 A1 | 6/2009 | Caprario et al. | |
| 2011/0058970 A1* | 3/2011 | Hugenroth | F01C 21/104 418/13 |
| 2012/0051918 A1 | 3/2012 | Glasspoole et al. | |
| 2012/0177495 A1 | 7/2012 | Virkler et al. | |

* cited by examiner

GAS TURBINE ENGINE ROTOR DISK-SEAL ARRANGEMENT

This application claims priority to PCT patent application No. PCT/US14/27316 filed Mar. 14, 2014, which claims priority to U.S. Patent Appln. No. 61/783,674 filed Mar. 14, 2013.

BACKGROUND OF THE INVENTION

1. Technical Field

This invention relates generally to gas turbine engines, and particularly to a gas turbine engine rotor disk-seal arrangement.

2. Background Information

Gas turbine engines such as those which power aircraft and industrial equipment employ a compressor to compress air which is drawn into the engine, a combustor for combustion of a mixture of compressed air and fuel, and a turbine to capture energy associated with the combustion of the fuel/air mixture. The compressor and turbine employ rotors which typically comprise a multiplicity of airfoil blades mounted on or formed integrally into the rims of a plurality of disks. The compressor disks and blades are rotationally driven by rotation of the engine's turbine. It is a well-known practice to arrange the compressor and turbine disks in a longitudinally axial stack in compressive inter-engagement with one another, which is maintained by a tie shaft which runs through axially-aligned central bores in the disks. The turbines of gas turbine engines typically incorporate alternating sets of rotating blades and stationary vanes. In this regard, it is commonplace to incorporate seals between adjacent sets of blades and vanes. Such seals prevent the leakage of cooling air injected into the interior of the rotor into the gas flow-path along which the vanes and blades are located. It is a well-known practice to mount such seals to cover plates (also commonly known as seal disks or mini-disks juxtaposed to the turbine's blade-retaining disks). Such seal disks are often provided with means for enhancing an adjacent disk's ability to retain to air foil blades mounted thereon. To minimize unwanted mechanical wear of the seal disks and the juxtaposed blade-retention disks, it is a known practice to provide an anti-rotation coupling of the seal disk to the blade retention disk. A well-known arrangement for such an anti-rotation coupling, involves the provision of an axially extending anti-rotation tab on either of the blade retention disk or seal disk which is received within a mating slot in the other of the blade retention disk and seal disk. To minimize rotor imbalances from such anti-rotation tabs, it has been the practice to provide such tabs in radially opposed pairs. It will be appreciated that pairs of such anti-rotation tabs may be beyond what is required to prevent rotation of these seal disks with respect to the juxtaposed blade retention disks and may contribute significantly to the weight of the combination of the blade retention disk and seal disk, thereby adversely affecting the efficiency of the engine. Accordingly, it has remained a challenge in the field of gas turbine engines to provide an anti-rotation coupling between a turbine blade retention disk and a juxtaposed seal disk which contributes minimally to the weight of a gas turbine engine turbine rotor.

SUMMARY OF THE DISCLOSURE

In accordance with the present invention, a disk-seal arrangement for a gas turbine engine rotor having a longitudinal axis of rotation comprises a blade-retention disk having a longitudinally opening a slot therein, a seal disk juxtaposed to the blade-retention disk, the seal-disk including a single anti-rotation tab having a pair of side surfaces and received in the anti-rotation slot in the blade-retention disk, the seal disk further including a pair of balance slots disposed immediately adjacent the side surfaces of the anti-rotation tab and a generally annular split-ring disposed longitudinally between and engageable with the blade-retention disk and the seal disk for reacting longitudinal loading therebetween, the ends of the split ring being seated against the side surfaces of the anti-rotation tab to prevent rotation of the split ring. In an additional embodiment of the foregoing, the balance slots have a collective volume being substantially equal to the volume of the anti-rotation tab for offsetting the weight thereof for rotational balance of the seal disk. In a further embodiment of the foregoing, the blade retention disk includes an end face and a collar extending longitudinally from the end face. The collar includes a radially outwardly extending circumferential flange, and the anti-rotation slot is disposed in such circumferential flange. In a still further embodiment of the foregoing, the seal disk has an axial end and is seated at the axial end against the split ring. In a still further embodiment of the foregoing, the blade-retention disk includes an annular groove therein adjacent the juncture of the collar with the end face of the blade-retention disk, the split ring being accommodated within such annular groove. In a still further embodiment of the foregoing, the split ring includes a radially inner-annular surface having a diameter and the annular groove in the blade-retention disk includes a radially inner surface having a diameter less than the radially inner annular surface of the split ring whereby the split ring may be radially compressed within the groove to allow the seal disk to move to longitudinally thereover when assembling the rotor disk seal arrangement of the present invention. In yet a further embodiment of the foregoing, the seal disk includes a medial portion and a collar extending longitudinally therefrom, the anti-rotation tab extending longitudinally from an end face of such seal disk collar. In a still further embodiment of the foregoing, the blade-retention disk collar is received at least partially within the seal disk collar. In a still further embodiment of the foregoing, the seal disk includes a radially outer rim and is provided with a circumferential flange extending radially outwardly from the radially outer rim of the seal disk. In a further embodiment of the foregoing, a plurality of airfoil blades are attached to a radially outer portion of the blade retention disk and the seal disk is provided with a circumferential flange extending radially outwardly from the rim of the seal disk, the circumferential flange of the seal disk bearing compressively against the radially outer portion of the blade-retention disk for enhanced retention of the foil air blade thereon and for urging the seal disk into engagement with the split ring. In a still further embodiment of the foregoing, a seal element adapted for rotational sealing against a stator of the gas turbine engine extends radially outwardly from the seal disk flange. In yet a further embodiment of the foregoing comma, the seal element comprises a knife-edge seal element.

DETAILED DESCRIPTION OF THE INVENTION

Figure 1:
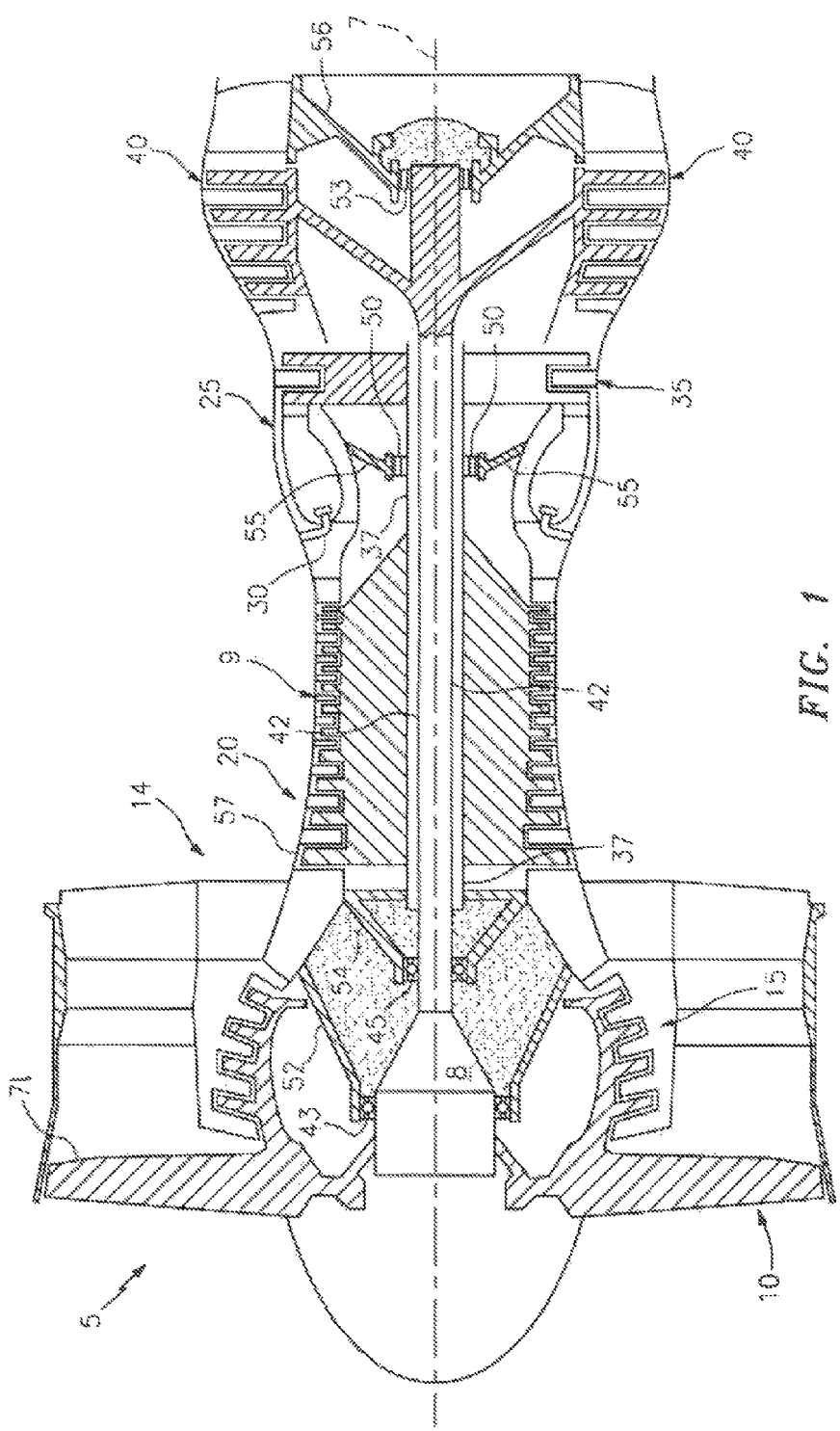
FIG. 1 is a simplified, partially sectioned schematic elevation of a turbo-fan gas turbine engine of the type employing the rotor disk-seal arrangement of the present invention.

Referring to FIG. 1, a turbofan gas turbine engine 5 has a longitudinal axis 7 about which bladed rotors 8 within vaned stator 9 rotate, stator 9 circumscribing the rotors. A fan 10 disposed at the engine inlet draws air into the engine. A low pressure compressor 15 located immediately downstream of fan 10 compresses air exhausted from fan 10 and a high pressure compressor 20 located immediately downstream of low pressure compressor 15 further compresses air received therefrom and exhausts such air to combustors 25 disposed immediately downstream of high pressure compressor 20. Combustors 25 receive fuel through fuel injectors 30 and ignite the fuel/air mixture. The burning fuel-air mixture (working medium fluid) flows axially to a high pressure turbine 35 which extracts energy from the working medium fluid and, in so doing, rotates hollow shaft 37, thereby driving the rotor of high pressure compressor 20. The working medium fluid exiting the high pressure turbine 35 then enters low pressure turbine 40, which extracts further energy from the working medium fluid. The low pressure turbine 40 provides power to drive the fan 10 and low pressure compressor 15 through low pressure rotor shaft 42, which is disposed interiorly of the hollow shaft 37, coaxial thereto. Working medium fluid exiting the low pressure turbine 40 provides axial thrust for powering an associated aircraft (not shown) or a free turbine (also not shown) which may be drivingly connected to a rotor of industrial equipment such as a pump or electrical generator.

Bearings 43, 45, 50 and 53 radially support the concentric high pressure and low pressure turbine shafts from separate frame structures 52, 54, 55 and 56 respectively, attached to engine case 57, which defines the outer boundary of the engine's stator 9. However, the present invention is also well suited for mid-turbine frame engine architectures wherein the upstream bearings for the low and high pressure turbines are mounted on a common frame structure disposed longitudinally (axially) between the high and low pressure turbines.

Figure 2:
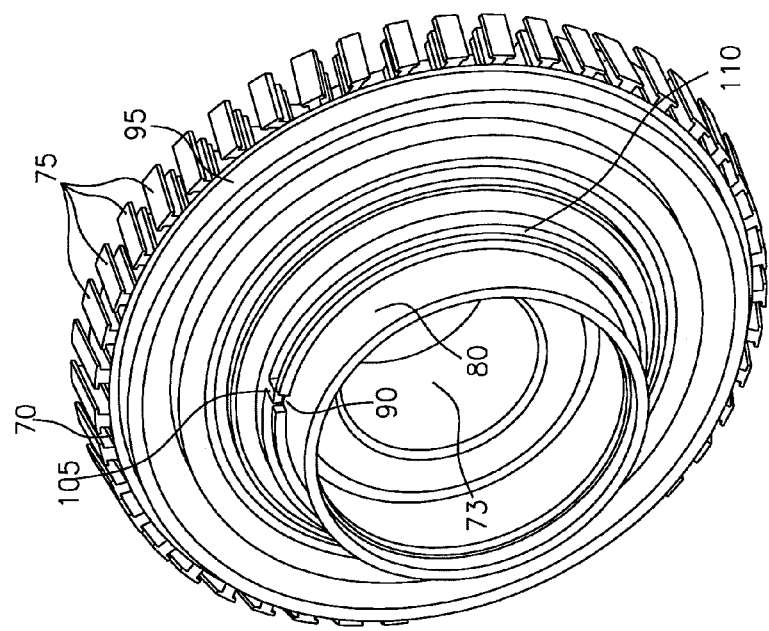
FIG. 2 is an isometric view of the disk-seal arrangement of the present invention.

Referring to FIG. 2, a portion of high-pressure turbine 35 is shown. The high-pressure turbine includes one or more blade-retention disks 70 bored at medial locations 73 thereon, the bores accepting a longitudinally axial tie-shaft (not shown) which, with a pair of fore and aft hubs (also not shown) maintain the blade-retention disks in longitudinal alignment in compressive interengagement with one another. Blade-retention disk 70 is provided at the radially outer rim thereof with a plurality of airfoil blades, the root portions thereof being shown at 75. It will be appreciated that blades 71 may be affixed to blade-retention disk 70 by any known methods such as the accommodation of the root ends of the blades within mating slots provided in the rim of disk 75 or, may be integrally formed with disk 70.

Figure 3:
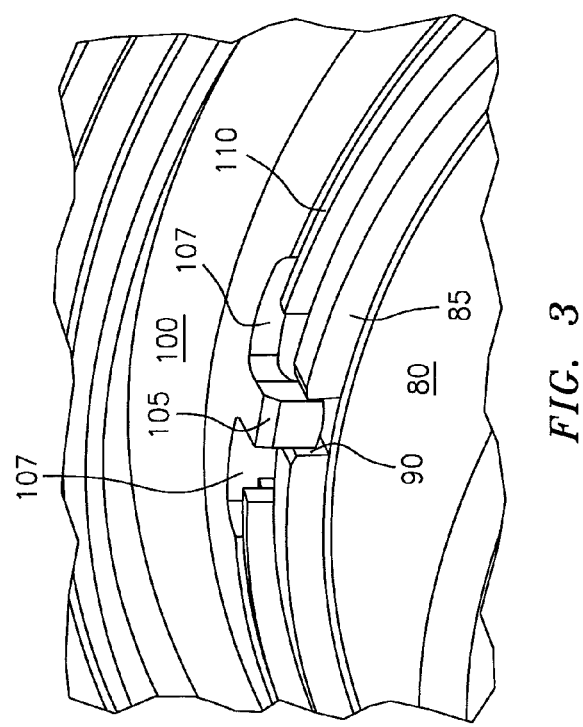
FIG. 3 is an enlarged isometric view of a portion of the disk-seal arrangement of the present invention illustrated in FIG. 2.
Figure 4:
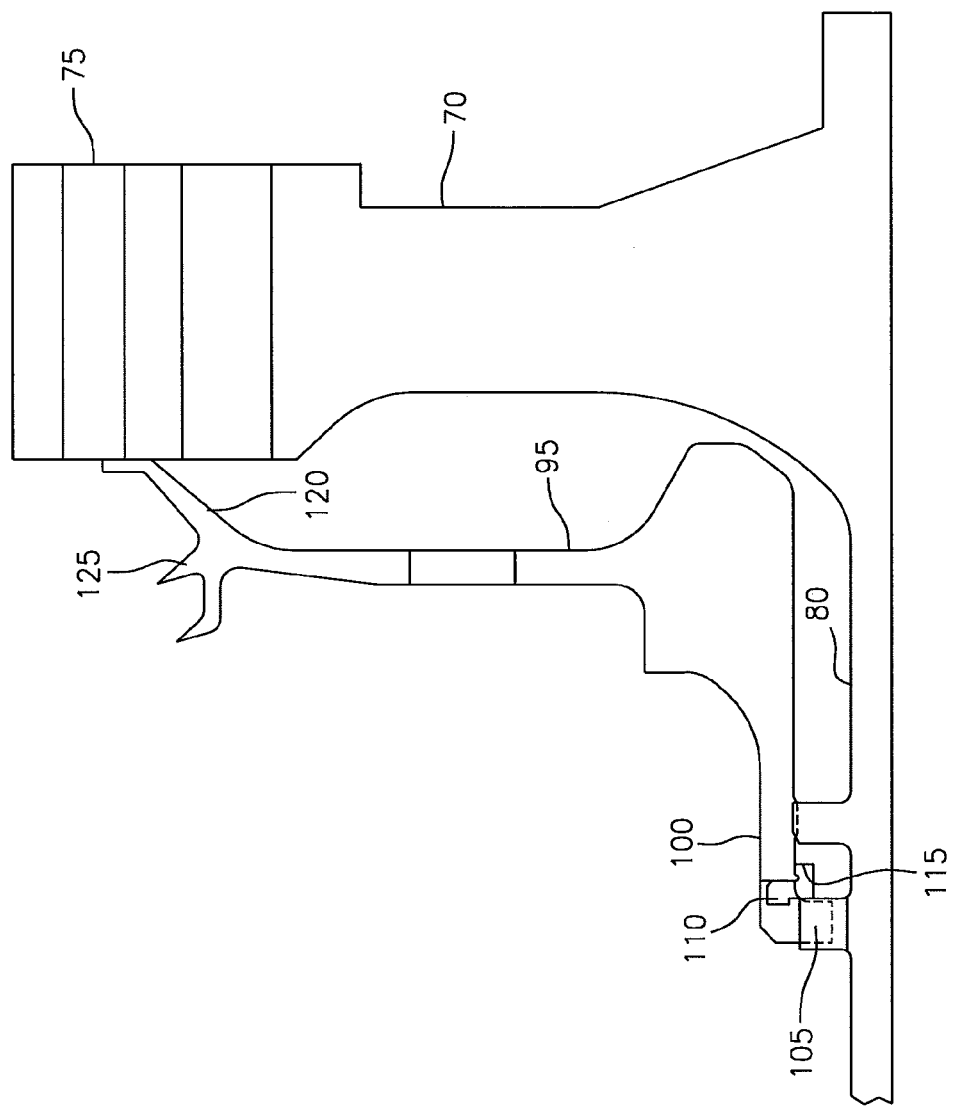
FIG. 4 is a side-sectional view of the disk-seal arrangement of the present invention.

Referring to FIGS. 2, 3, and 4, blade-retention disk 70 is provided with a collar 80 extending longitudinally from a medial portion of an end face of blade-retention disk 70. Collar 80 includes a radially outwardly extending circumferential flange 85 provided with an anti rotation slot 90 therein. A seal disk (cover plate or mini disk) 95 is juxtaposed to blade-retention disk 70 and includes at a medial portion of the seal disk, a collar 100 extending longitudinally from a medial portion of the seal disk. Seal disk collar 100 includes a single anti-rotation tab 105 extending longitudinally from an end face of collar 100 and a pair of balance slots 107, disposed immediately adjacent the side surfaces of anti-rotation tab 105 for offsetting the weight of anti-rotation tab 105, the balance slots having a collective volume substantially equal to that of anti-rotation tab 105. Collar 80 of blade-retention disk 70 is received within collar 100 of seal disk 95 such that anti-rotation tab 100 is received within slot 90 in circumferential flange 85 of the blade-retention disk thereby preventing any unwanted relative rotation between blade-retention disk 70 and seal disk 95.

The disk-seal arrangement of the present invention also comprises an annular split ring 110 accommodated within an annular groove 115 (see FIG. 4) adjacent the juncture of blade-retention disk collar 80 and the end face of blade-retention disk 70 from which collar 80 extends. As best seen in FIG. 3, anti-rotation tab 105 extends between the ends of split-ring 110. Accordingly, it will be seen that any tendency of split-ring 110 to rotate with respect to blade-retention disk 70 or seal disk 95 will be prevented by the seating of the ends of the split ring against the side surfaces of anti-rotation tab 105. Again, as best seen in FIG. 3, split ring 110 extends radially outwardly from groove 115 sufficiently to react axial loading between blade-retention disk 70 and seal disk 95, the axial end of the seal disk being seated against that portion of split ring 110 extending outwardly from groove 115. The diameter of groove 115 is slightly less than the inner diameter of the split ring whereby the split ring may be compressed into the groove for assembly purposes as will be disclosed in greater detail hereinafter.

Referring particularly to FIG. 4, seal disk 95 includes at a radially outer rim thereof a circumferential flange 120 which bears compressively against the radially outer portion of blade-retention disk 70 at the radial location of the roots of blades 75 within the mating slots therefor in blade-retention disk 70. The compressive engagement of flange 120 with blade-retention disk 70 also urging seal disk 95 into engagement with split ring 110 thereby maintaining the longitudinal integrity of the disk-seal arrangement of the present invention by restraining relative axial movement of seal disk 95 and blade-retention disk 70. A seal element such as knife-edge seal element 125 extends radially outwardly from flange 120 for rotational sealing against a complementary stationary seal element (not shown) such as that provided on a stator mounted tangential on board cooling air injector (not shown).

The procedure for assembling the tangent rotor disk-seal arrangement of the present invention is as follows. With blade retention disk 70 mounted on the engine's rotor shaft, split ring 110 is expanded over collar 80 of blade retention-disk 70 and seated within axial groove 115. Split ring 110 is then compressed into groove 115 and the seal disk 95 is moved into juxtaposition with respect to blade retention disk 70 such that collar 80 of blade retention disk 70 is received within collar 100 of the seal disk and anti-rotation tab 105 is received within mating slot 90 in circumferential flange 85 on collar 80 of blade-retention disk 70. When the blade retention disk and seal disk are so positioned, the split ring is allowed to expand within groove 115 to the position show in FIG. 3 wherein the split ring is disposed axially between the blade retention disk 70 and seal disk 95 to react any axial loading therebetween.

From the foregoing, the advantages of the present invention over prior anti-rotation schemes for blade-retention disk and seal disk arrangements will be evident. Since only a single anti-rotation tab is required to prevent relative rotation of the blade-retention disk and the seal disk, additional rotor weight associated with this anti-rotation function is minimized. Radially opposed pairs of anti-rotation tabs are not necessary to achieve rotor balance because of the balance slots adjacent the anti-rotation tab 105 on either side thereof which offset the added weight of the anti-rotation tab. Relative rotation of split ring 110 with respect to the blade-retention and the sealing disk is provided without any additional details on the split ring. Accordingly, the split ring may be positioned in the assembly of the disk-seal arrangement of the present invention without specialized tooling which would be required if anti-rotation details were to be used on the split ring.

While the present invention has been described within the context of a single preferred embodiment thereof, it will be appreciated that various modifications to this preferred embodiment described and illustrated herein may be made without departing from the present invention. For example, while a knife edge seal element has been illustrated and described as being disposed at the radially outer edge of seal disk 95, it will be appreciated that various other types of sealing elements, either contacting or non-contacting (e.g., halo seals or brush seals) may be employed. Furthermore, although the disk-seal arrangement of the present invention has been described within the context of the high-pressure turbine section of a gas-turbine engine, it will be appreciated that the disk-seal arrangement of the present invention may be employed with equal utility in other sections of a gas-turbine engine wherein juxtaposed blade-retention disks and seal disks are employed. It will be understood that various modifications to the preferred embodiment may be made without departing from the present invention and it is intended by the appended claims to cover any such modifications as fall within the true spirit and scope of the invention herein.

Having thus described the invention or what is claimed is:

1. A disk-seal arrangement for a gas turbine engine rotor having a longitudinal axis of rotation, comprising:
    a blade retention disk having a longitudinally opening slot therein;
    a seal disk juxtaposed to said blade retention disk, said seal disk including a single antirotation tab having a pair of side surfaces and received in said antirotation slot in said blade retention disk
    said seal disk further including a pair of balance slots disposed immediately adjacent said side surfaces of said antirotation tab; and
    a generally annular split ring having a pair of ends and being disposed longitudinally between and engageable with said blade retention disk and said seal disk for reacting longitudinal loading therebetween, said ends of said split ring being seated against said side surfaces of said antirotation tab.

2. The disk-seal arrangement of claim 1 wherein said antirotation tab has a volume and said balance slots have a collective volume, the collective volume of said balance slots being substantially equal to the volume of said antirotation tab for off-setting the weight thereof for rotational balance of said rotor.

3. The disk-seal arrangement of claim 1 wherein said blade retention disk has an end face and includes a collar extending longitudinally from said end face of said blade retention disk, said collar including a radially outwardly extending circumferential flange, said antirotation slot being provided in said circumferential flange.

4. The disk-seal arrangement of claim 3 wherein said blade retention disk includes an annular groove therein, adjacent the juncture of said collar and said end face, said split ring being accommodated within said annular groove.

5. The disk-seal arrangement of claim 4 wherein said split ring includes a radially inner annular surface having a diameter and said annular groove in said blade retention disk includes an annular surface having a diameter less than the diameter of said split ring thereby allowing said split ring to be compressed radially inwardly whereby to allow said seal disk to be moved longitudinally thereover when assembling said rotor disk-seal arrangement.

6. The rotor disk-seal arrangement of claim 3 wherein said seal disk includes a medial portion and a collar having an end face extending longitudinally from said medial portion, said antirotation tab extending longitudinally from said end face of said seal disk collar.

7. The rotor disk-seal arrangement of claim 6 wherein said blade retention disk collar is received at least partially within said seal disk collar.

8. The disk-seal arrangement of claim 1 wherein said seal disk has an axial end, said seal disk being seated at said axial end thereof, against said split ring.

9. The rotor disk-seal arrangement of claim 1 wherein said seal disk includes a radially outer rim and is provided with a circumferential flange extending radially outwardly from said radially outer rim of said seal disk.

10. The rotor disk-seal arrangement of claim 9 wherein said blade retention disk includes a radially outer portion, and further including a plurality of airfoil blades attached to said blade retention disk at said radially outer portion thereof, said circumferential flange of said seal disk bearing compressively against said radially outer portion of said blade retention disk for enhanced retention of said airfoil blades on said blade retention disk and for urging said seal disk into engagement with said split ring.

11. The rotor disk-seal arrangement of claim 9 and further including a seal element adapted for rotational sealing against a stator of said gas turbine engine said seal element extending radially outwardly from said circumferential flange.

12. The rotor disk-seal arrangement of claim 11 wherein said seal element comprises a knife edge seal element.

* * * * *